United States Patent [19]

Meisinger et al.

[11] Patent Number: 5,507,537
[45] Date of Patent: Apr. 16, 1996

[54] APPARATUS FOR GRIPPING AND SEALING ON THE EXTERNAL SURFACE OF A FLUID CONDUCTOR

[75] Inventors: Stanlee W. Meisinger, Golden Valley; Daniel J. Cornish, Brooklyn Park, both of Minn.

[73] Assignee: FasTest, Inc., St. Paul, Minn.

[21] Appl. No.: 252,846

[22] Filed: Jun. 2, 1994

[51] Int. Cl.⁶ ................................................ F16L 37/08
[52] U.S. Cl. ........................ 285/312; 285/232; 285/346
[58] Field of Search ................................. 285/101, 322, 285/323, 312, 346

[56] References Cited

U.S. PATENT DOCUMENTS

| | | |
|---|---|---|
| 3,738,688 | 6/1973 | Racine . |
| 3,779,587 | 12/1973 | Racine . |
| 3,799,207 | 3/1974 | Richardson et al. . |
| 3,868,132 | 2/1975 | Racine . |
| 3,923,325 | 12/1975 | Slater, Jr. . |
| 3,962,769 | 6/1976 | Smida . |
| 4,154,465 | 5/1979 | Van Meter . |
| 4,189,162 | 2/1980 | Rasmussen et al. . |
| 4,225,159 | 9/1980 | Van Meter . |
| 4,254,801 | 3/1981 | Gerthoffer et al. . |
| 4,326,407 | 4/1982 | Van Meter et al. . |
| 4,421,346 | 12/1983 | Seiler . |
| 4,447,077 | 5/1984 | Palmer . |
| 4,540,201 | 9/1985 | Richardson . |
| 4,753,461 | 6/1988 | Miller . |
| 4,759,572 | 7/1988 | Richardson . |
| 4,884,830 | 12/1989 | Meisinger . |
| 4,921,282 | 5/1990 | Meisinger . |
| 5,028,080 | 7/1991 | Dennany, Jr. . |
| 5,073,038 | 12/1991 | O'Connell . |
| 5,074,332 | 12/1991 | Jones . |
| 5,087,086 | 2/1992 | Snedeker . |
| 5,106,129 | 4/1992 | Camacho et al. . |
| 5,118,140 | 6/1992 | Racine et al. . |
| 5,143,347 | 9/1992 | Lee et al. . |
| 5,181,543 | 1/1993 | Hendzel . |
| 5,186,199 | 2/1993 | Murphy et al. . |
| 5,193,856 | 3/1993 | Suzuki . |
| 5,203,477 | 4/1993 | Lo . |
| 5,209,528 | 5/1993 | Weh et al. . |
| 5,279,204 | 1/1994 | Arnold . |
| 5,285,807 | 2/1994 | Nitzberg . |
| 5,289,850 | 3/1994 | Sarson et al. . |
| 5,343,798 | 9/1994 | Meisinger et al. . |

FOREIGN PATENT DOCUMENTS

372926  5/1932  United Kingdom .................. 285/312

OTHER PUBLICATIONS

"Quick Connect Process Couplings", Production Control Units, Inc. (PCU) product bulletin 122R, Jan. 1981, 4 pages.
Ramer Products, Inc. Test Tools Product Brochure, (no date given), 10 pages.
"The Tuthill PR Tube Connector for pressure testing, vacuum dehydrating, and other applications requiring a quick, leak–proof connection", Tuthill Corporation product brochure, (no date given), 1 page.
"NuJaws™ External Connectors", FasTest, Inc. brochure, 1992, 2 pages.
"FasTest NuJaws™ external pneumatic operated connector", Installation & Operating Instructions brochure, FasTest, Inc., NuJaws Instructions, Aug. 1992, 4 pages.

*Primary Examiner*—Dave W. Arola
*Attorney, Agent, or Firm*—Merchant, Gould, Smith, Edell, Welter & Schmidt

[57] ABSTRACT

A fluid connector (40) for gripping and sealing on an external surface of a fluid conductor (61). The fluid connector (40) includes a seal (62) which is forced into a bore (70) of a piston (66) having a smaller diameter than the seal, so that the seal (62) is radially squeezed to seal the external surface of the fluid conductor (61). A collet assembly (50) of the fluid connector (61) is forced to reduce the diameter to grip the external surface of the fluid conductor (61). A spring (68) which is disposed in the piston (66) compensates seal preload mechanism for variations in fluid conductor size.

11 Claims, 3 Drawing Sheets

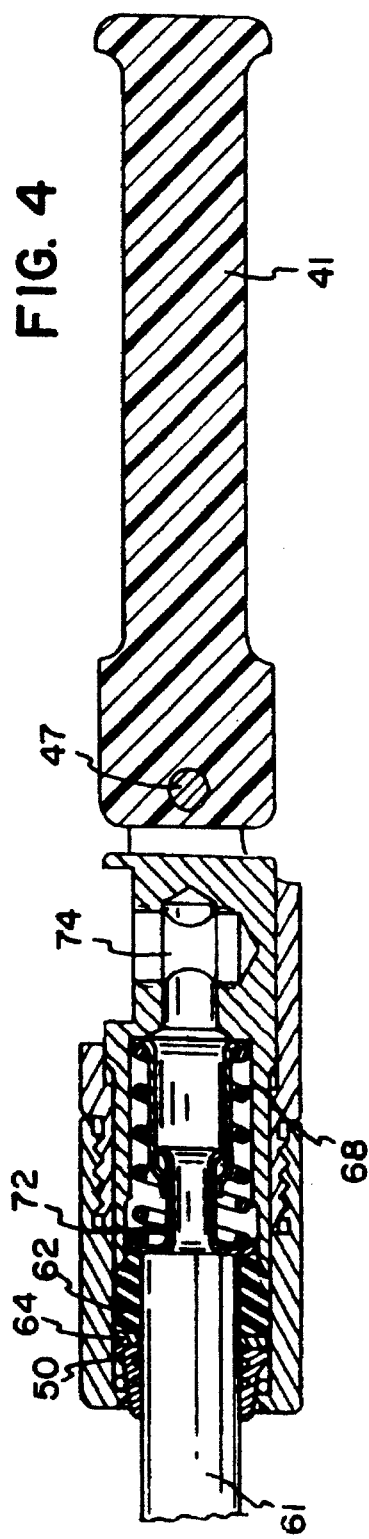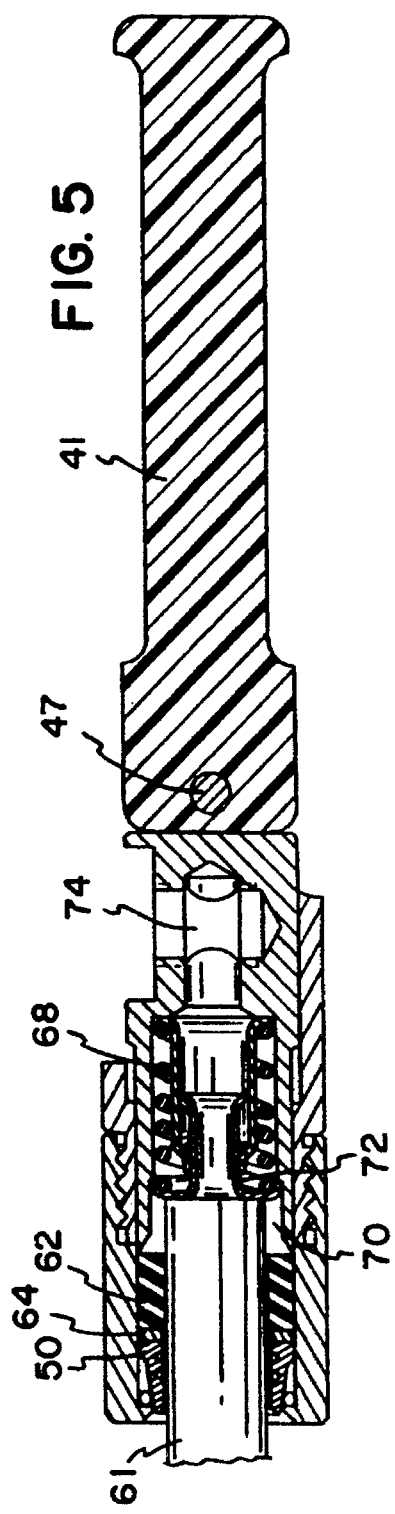

5,507,537

APPARATUS FOR GRIPPING AND SEALING ON THE EXTERNAL SURFACE OF A FLUID CONDUCTOR

FIELD OF THE INVENTION

The present invention relates to an apparatus for gripping and sealing a fluid conductor. More particularly, the present invention relates to a fluid connector for sealing and gripping the external surface of a fluid conductor.

BACKGROUND OF THE INVENTION

In many applications, a fluid connector is used for testing, filling, flushing of a fluid conductor, such as a pipe or tube, which requires leak free connections. The connector must grip and/or seal the fluid conductor without leakage or detachment from the fluid conductor, upon application of fluid pressure or vacuum.

Some currently existing fluid connectors do not disclose adequate compensating means for the fluid conductor tolerance variation and/or raised burrs on the fluid conductor end.

For example, some connectors must be adjusted for tube size variation by rotating a threaded cap. Too large a setting and the connector will not grip the fluid conductor or tube, while too small a setting and the connector may break or damage the fluid conductor or tube upon actuation.

Some connectors do partially address the problem of tube variation by using two cam/lever systems that independently grip and seal. However, these connectors use two levers. With the lever that actuates the gripping mechanism so easy to move under pressure that it will release the grip and allow connector to fly off under pressure. These connectors also marr the surface of the test pipe in order to grip the test pipe.

Some other connectors would have difficulty with a raised burr on the end of the tube because the collet in the collet assembly does not expand.

Yet some connectors use a bell shaped collet member which must penetrate the test piece surface to grip. This collet would be damaged if used on a hard surfaced test piece. Some of the current designs may release the gripping action of the collet under fluid pressure, in an accidental actuation of the lever or other mechanism, which closes or locks connector to the tube.

The present invention overcomes many of the disadvantages associated with such a fluid connector.

SUMMARY OF THE INVENTION

The present invention relates to a fluid connector for sealing and gripping the external surface of a fluid conductor.

In one embodiment of the present invention, the fluid connector is tightly gripped and sealed on the external surface of the fluid conductor when an actuating device forces a collet assembly to reduce its diameter so as to grip the fluid conductor and forces a seal into a bore with a reduced diameter so as to seal the fluid conductor.

In one embodiment, the fluid connector for sealing the external surface of the fluid conductor, comprises:

a seal disposed around the external surface of the fluid conductor;

means, having a bore, for receiving a radially squeezed portion of the seal, the receiving means being disposed against the seal; and means for pushing the receiving means toward the seal, the seal being forced into the bore which has a smaller diameter than an outer diameter of the seal, the radially squeezed portion of the seal radially sealing the external surface of the fluid conductor.

Still in one embodiment, the receiving means includes a piston and a spring. The spring is disposed in the piston. When the pushing means pushes the piston, the spring is compressed, and the radially squeezed portion of the seal is pushed into the bore of the piston. When the pushing means releases the receiving means, the spring pushes the seal out of the bore of the piston. Thus, the spring compensates the seal preload mechanism for variations in fluid conductor size.

Yet in one embodiment, the pushing means includes a rotating lever. The rotating lever might be suitably connected to the rear housing by a pin or the like.

In one embodiment, the receiving means includes a fluid filling port. The port is in fluid communicating with the bore of the piston and the fluid conductor.

In one embodiment, means for gripping the fluid conductor around the external surface of the fluid conductor is disposed on one side of the seal away from the piston. The gripping means includes a collet assembly having expandable/contractible diameter so that when the collet assembly has a smaller diameter, the collet assembly grips on the external surface of the fluid conductor, and when the collet assembly has a larger diameter, the collet assembly releases the fluid conductor.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters generally indicate corresponding parts throughout the several views.

FIG. 4 is a longitudinally cross-sectional view of the fluid connector self-locking the fluid conductor when a lever is deactuated.

FIG. 5 is a longitudinally cross-sectional view of the fluid connector releasing the fluid conductor.

DETAILED DESCRIPTION OF THE PREFERRED EMBODIMENT

Figure 1:
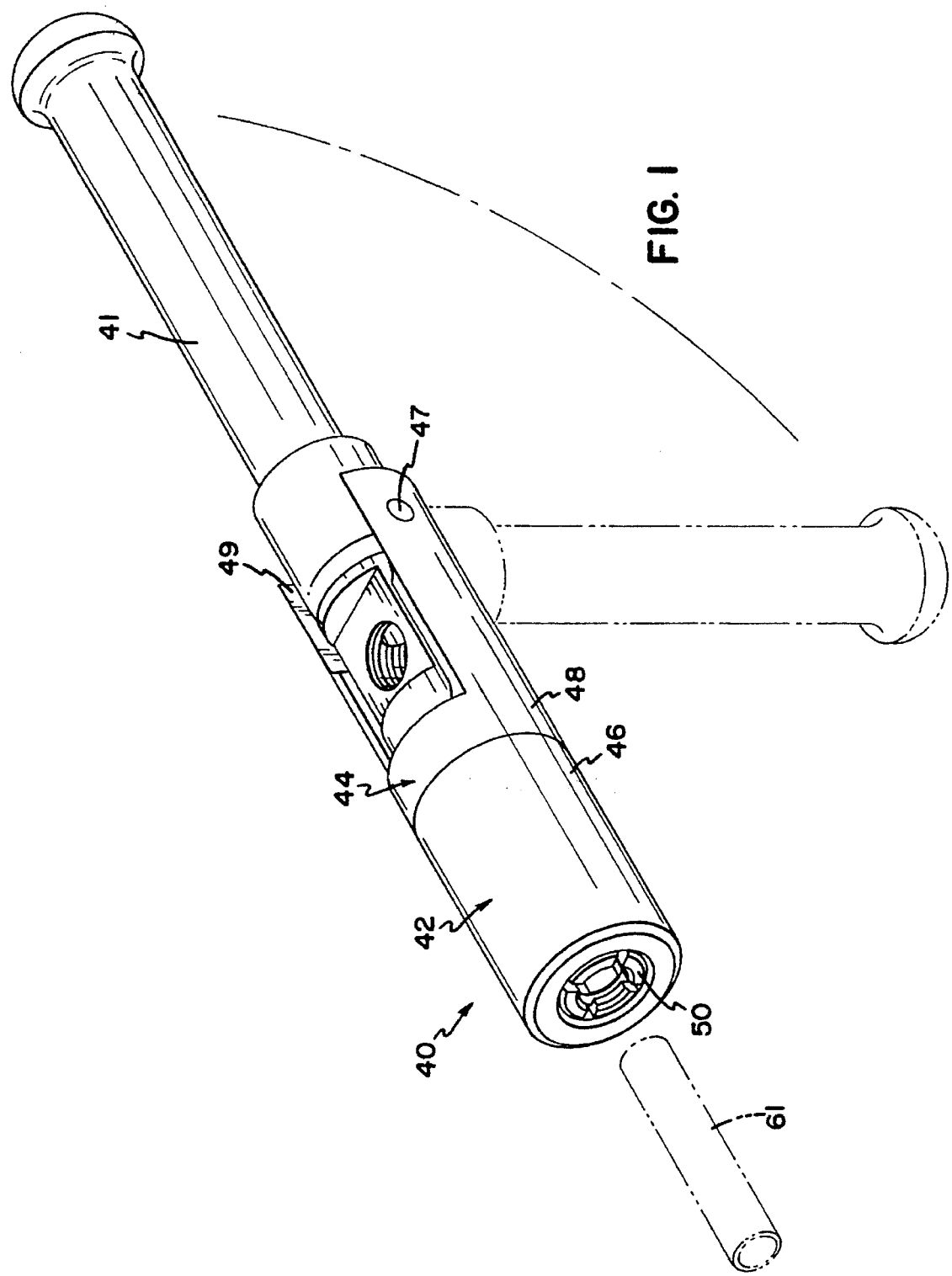
FIG. 1 is a perspective view of an embodiment of a fluid connector in accordance with the principles of the present invention.

Referring to FIG. 1, there is shown an embodiment of a fluid connector 40 in accordance with the principles of the present invention. A lever 41 is axially aligned with a longitudinal axis of the fluid connector 40 while the fluid connector 40 is not in an actuating operation. The lever 41 is rotated about a degree, such as 90 degrees as shown in phantom lines of FIG. 1, when the fluid connector 40 is in an actuating operation.

The fluid connector 40 includes a front housing 42 and a rear housing 44. A rear portion 46 of the front housing 42 is threadedly mounted on a front portion 48 of the rear housing 44 (see FIG.2). The lever 41 is rotated around a pin 47 which is mounted at a rear portion 49 of the rear housing 44. The lever 41 is able to rotate both upwardly or downwardly even though only the downward phantom lines of the lever 41 are shown in FIG. 1.

Figure 2:
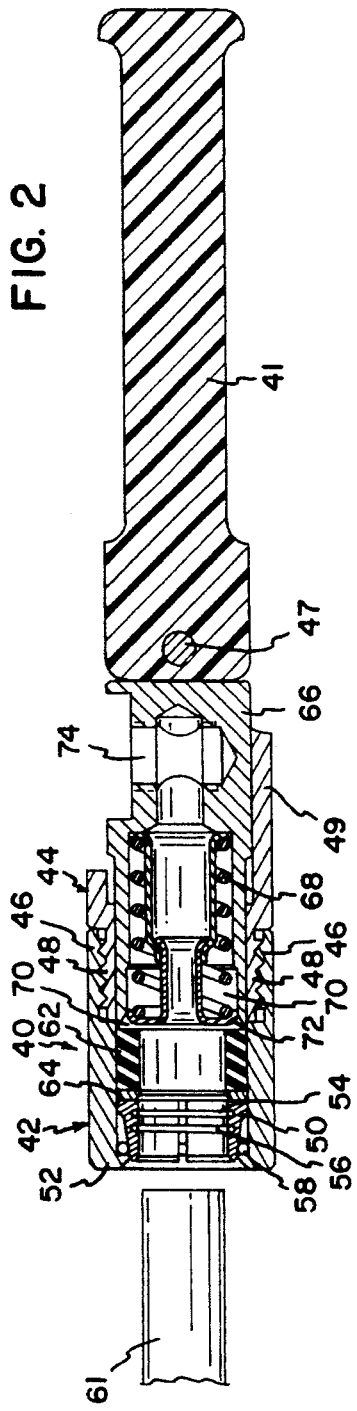
FIG. 2 is a longitudinally cross-sectional view of the fluid connector not in an actuating operation.

In FIG. 2, there is shown that a collet assembly 50 is disposed at a front portion 52 of the front housing 42. A couple of spring rings 54,56 are disposed on the inner surface of the collet assembly 50 and are radially biased outward toward the inner surface of the collet assembly 50. Accordingly, the collet assembly 50 is radially biased toward the inner surface of the front housing 42 at the front portion 52.

A wear ring 58 is disposed between the outer surface of the collet assembly 50 and the inner surface of the front housing 42 at the front portion 52 so as to reduce the wear of the collet assembly 50 and the front housing 42. The outer surface of the collet assembly 50 is tapered so that when the collet assembly 50 is moved toward the front end of the front housing 42, the diameters, outer and inner diameters, of the collet assembly 50 are reduced due to contact between the wear ring 58 at the front end of the front housing 42 and the tapered surface of the collet assembly 50. Thus, the contact between the wear ring 58 and the tapered surface of the collet assembly 50 forces the collet assembly 50 to grip something such as a pipe or tube or fluid conductor 61.

An elastic seal 62, as shown in FIG. 2, is disposed proximate at the middle portion of the front housing 42. A washer 64 is disposed between the collet assembly 50 and the seal 62 to prevent the seal 62 from being worn out and blown out.

A piston 66 is disposed in the rear housing 44 extending from the rear portion 49 to the front portion 48 of the rear housing 44. A spring 68 is enclosed in a bore 70 of the piston 66 by a seal guide 72 which is disposed at the front end of the piston 66.

An air or fluid testing port 74 is disposed in the piston 66. One side of the port 74 is in communication with an external air pipe or fluid conductor (not shown) so as to communicate with the fluid conductor 61, and the other side of the port 74 is vertically connected with a fluid or air passageway defined in the seal guide 72. The fluid or air passageway of the seal guide 72 is further in fluid communication with a passageway defined in the fluid conductor 61. Thus, the testing fluid or air is introduced from the port 74, through the seal guide 72, to the seal 62, the washer 64, into the fluid conductor 61.

Figure 3:
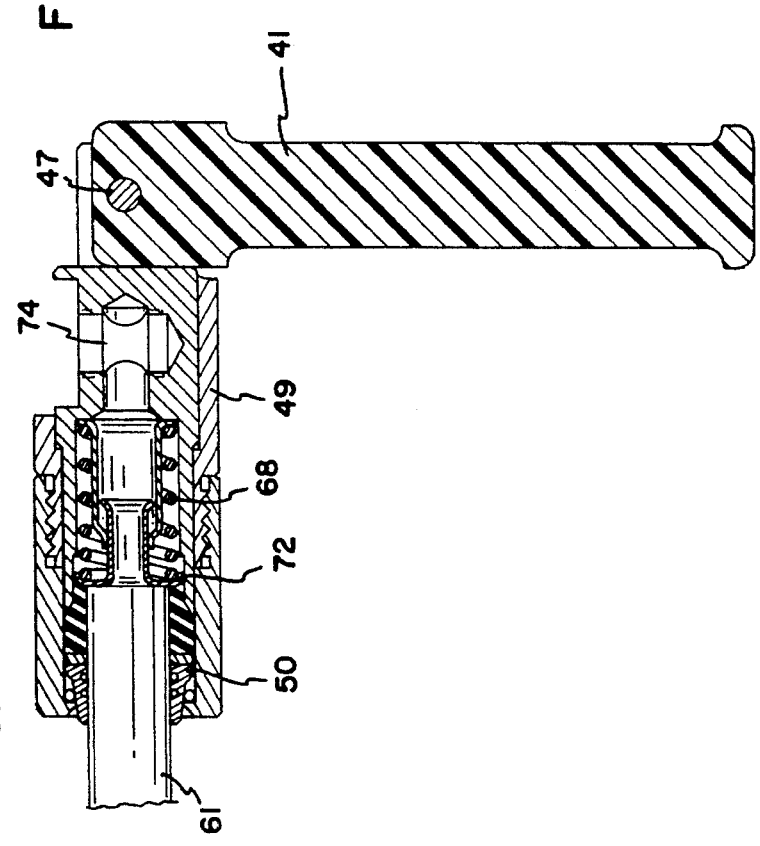
FIG. 3 is a longitudinally cross-sectional view of the fluid connector gripping and sealing the fluid conductor in an actuating operation.

From FIG. 2 to FIG. 3, an actuating operation, i.e., gripping and sealing operation, between the fluid conductor 61 and the fluid connector 40 is shown. The fluid conductor 61 is inserted into the fluid passageway of the collet assembly 50, the washer 64, and the seal 62 until the contact with the seal guide 72 is sensed. The fluid conductor 61 is axially aligned with the lever 41. Then the lever 41 is rotated 90 degrees around the pin 47 while pushing the piston 66 toward the front housing 42, which causes the seal 62, the washer 64, and the collet assembly 50 to move toward the front end of the front housing 42. Thus, the collet assembly 50 is forced inwardly by the wear ring 58 so as to radially grip the fluid conductor 61 disposed therein. Meanwhile, the seal 62 is forced to move into the bore 70 of the piston 66 and against the seal guide 72 which compresses the spring 68. The maximum diameter of the bore 70 is smaller than the outer diameter of the seal 62. Thus, the seal 62 is forced to enter into the reduced diameter of the bore 70, which causes the seal 62 to be radially squeezed inward onto the fluid conductor 61, creating an effective seal against the outer diameter of the fluid conductor 61 and inner diameter of the piston 66. The compressive force of the spring 68 is applied through the seal guide 72 and against the back of the seal 62 so as to provide a sufficient force to resist the fluid like movement of the seal 62 away from the outside diameter of the fluid conductor 61, and into the bore 70 of the piston 66. Then, the fluid pressure enters fluid connector 40 through the port 74 perpendicularly intersecting the passageway of the piston 66.

From FIG. 4 to FIG. 5, a disconnecting operation between the fluid conductor 61 and the fluid connector 40 is shown. The lever 41 is rotated back to the position axial alignment with the fluid conductor 61. The compressed spring 68 tends to push fluid conductor 61 and the seal 62 out of the bore 70 of the piston 66. Since the collet assembly 50 tightly grips the fluid conductor 61, the compressed spring 68 cannot push the fluid conductor 61 out of the collet assembly 50 and pushes the seal 62 partially out of the bore 70. Thus, the compressed spring 68 can only push the piston 66 toward the lever 41 as shown in FIG. 4. On the other hand, the collet assembly 50 is further pushed toward the front end of the front housing 42 by the compressed spring 68 so that the collet assembly 50 even more tightly grips the fluid conductor 61. Thus, it prevents the fluid conductor 61 from flying out of the front housing 42, and the safety requirement is satisfied.

In order to release the fluid conductor 61 from being gripped by the collet assembly 50 and sealed by the seal 62, the fluid conductor 61 is rather pushed into the housings 42, 44. Accordingly, the collet assembly 50 is disengaged from the wear ring 58 so that the collet assembly 50 is expanded radially which releases the fluid conductor 61 from being gripped. Accordingly, the compressed spring 68 pushes the piston 66 away from the seal 62 so that the fluid conductor 61 is released from being sealed by the seal 62. The fluid conductor 61 can now be removed from the fluid connector 40.

It is appreciated that the variations in the collet assembly 50, the washer 64, and the seal 62 are designed to accommodate different pipe, tube, or fluid conductor configurations, i.e., the fluid conductor having grooves, bumps, or threads with or without the collet assembly 50. Multiple sizes of the fluid conductor 61 can be used by simply changing the size of the collet assembly 50, the washer 64, and the seal 62.

It is also appreciated that the various methods of actuating the fluid connector 40, i.e., mechanical methods by using sleeves, or toggle levers, or springs; or pneumatic or hydraulic methods; or electromechanical methods by using cams or ball screws; or electromagnetic methods by using magnets; etc.

In addition, it is appreciated that the seal can be used in devices which only have the sealing mechanism and do not have the gripping mechanism. Thus, in another embodiment of the present invention, the collet assembly 50 can be deleted.

The material of the seal is preferably made of rubber. It is appreciated that the material of the seal can also be made of polymer, plastics, etc. The material of the remaining parts of the fluid connector 40 is made of metal or plastics, etc.

It will be appreciated that alternate embodiments in keeping with the principles of the present invention might be utilized. It is to be understood, however, that even though numerous characteristics and advantages of the invention would be set, together with details of the structure and function of the invention, the disclosure is illustrative only, and changes may be made in detail, especially in matters of shape, size and arrangement of parts, within the principle of the invention, to the full extent indicated by the broad general meaning of the terms in which the appended claims are expressed.

What is claimed is:

1. An apparatus for sealing on an external surface of a tube, comprising:

a seal disposed around the external surface of the tube;

piston means having a bore, the piston means normally being disposed against a first side of the seal and the seal normally being disposed outside of the bore, the bore having a smaller maximum diameter than an outer diameter of the seal;

limiting means, disposed against a second side of the seal, for limiting a movement of the seal toward the limiting means upon the seal being pushed toward the limiting means by the piston means; and means for pushing the piston means against the seal upon actuation of the pushing means, upon the actuation, the seal being compressed between the piston means and the limiting means, and a portion of the seal being radially squeezed and forced into the bore, the radially squeezed portion of the seal radially sealing the external surface of the tube in the bore.

2. An apparatus according to claim 1, wherein the pushing means includes a rotating lever.

3. An apparatus according to claim 1, wherein the pushing means connects to the piston means by a pin.

4. An apparatus according to claim 1, wherein the tube is a fluid conductor.

5. An apparatus according to claim 1, wherein the piston means includes a spring, when the pushing means pushes the piston means, the spring is compressed, and when the pushing means releases the piston means, the spring pushes the piston means away from the seal.

6. An apparatus according to claim 5, wherein the spring is compressed further inside the bore when a larger size of the tube is inserted into the piston means, and the spring is less compressed inside the bore when a smaller size of the tube is inserted into the piston means.

7. An apparatus according to claim 1, wherein the piston means includes a port, the port being in communication with the tube.

8. An apparatus for gripping and sealing on an external surface of a tube, comprising:

a seal disposed around the external surface of the tube;

piston means having a bore, the piston means normally being disposed against a first side of the seal and the seal normally being disposed outside of the bore, the bore having a smaller maximum diameter than an outer diameter of the seal;

means, disposed against a second side of the seal, for gripping the tube around the external surface of the tube, the gripping means limiting a movement of the seal toward the gripping means upon the seal being pushed toward the gripping means by the piston means; and means for pushing the piston means against the seal upon actuation of the pushing means, upon the actuation, the seal being compressed between the piston means and the gripping means, and a portion of the seal being radially squeezed and forced into the bore, the radially squeezed portion of the seal radially sealing the external surface of the tube in the bore.

9. An apparatus according to claim 8, wherein the gripping means includes a collet assembly having an expandable diameter so that when the collet assembly has a smaller diameter, the collet assembly grips on the external surface of the tube, when the collet assembly has a larger diameter, the collet assembly releases the tube.

10. An apparatus according to claim 8, wherein the piston means includes a spring, when the pushing means pushes the piston means, the spring is compressed, and when the pushing means releases the piston means, the spring pushes the piston means away from the seal.

11. An apparatus according to claim 10, wherein the spring is compressed further inside the bore when a larger size of the tube is inserted into the piston means, and the spring is less compressed inside the bore when a smaller size of the tube is inserted into the piston means.

* * * * *